United States Patent [19]

Davis et al.

[11] Patent Number: 5,017,349

[45] Date of Patent: May 21, 1991

[54] METHOD FOR DESULFURIZATION OF FLUE GASES

[75] Inventors: Wayne T. Davis; Gregory D. Reed, both of Knoxville, Tenn.; Timothy C. Keener, Cincinnati, Ohio

[73] Assignee: The University of Tennessee Research Corporation, Knoxville, Tenn.

[21] Appl. No.: 326,378

[22] Filed: Mar. 21, 1989

[51] Int. Cl.$^5$ .......................... C01B 17/00; B01J 8/00
[52] U.S. Cl. ..................................... 423/242; 423/244
[58] Field of Search .......... 423/242 R, 242 A, 244 A, 423/244 R

[56] References Cited

U.S. PATENT DOCUMENTS

| | | | |
|---|---|---|---|
| 2,718,453 | 9/1955 | Beckman | 423/244 |
| 4,115,518 | 9/1978 | Delmon et al. | 423/244 |
| 4,279,873 | 7/1981 | Felsvang et al. | 423/242 |
| 4,793,981 | 12/1988 | Doyle et al. | 423/244 |

OTHER PUBLICATIONS

"Removal of Sulfur and Nitrogen Oxides from Stack Gases, by Ammonia", C. C. Shale, D. G. Simpson and P. S. Lewis, *Important Chemical Reaction in Air Pollution Control*, Chemical Engineering Progress Symposium Series, 115, Vol. 67, (19/1), pp. 52–58.

"Ammonia Injection: A route to Clean Stacks", C. C. Shale, Pollution Control and Energy Needs, Advances in Chemistry Series 127, American Chemical Society, Washington, D. C. (1973), pp. 195–205.

"Research on the Simultaneous Removal of $SO_x$ and Particulates from Stoker-Fired Boilers", W. T. Davis, T. C. Kenner, C. S. Means and R. B. Dooley, Proceedings of the 70th Annual Meeting of the Air Pollution Control.

"Simultaneous Removal of Sulfur Oxides and Particulate Matter from Stoker-Fired Boiler Flue Gas with a Piolt Plant Fabric Filter Collector" Timothy C. Keener, Thesis, The University of Tennessee, Knoxville, TN., Aug., 1977.

"Research on the Removal of $SO_2$ by Additive Injection Techniques on a Stoker-Fired Boiler", Wayne T. Davis, Timothy C. Keener and Lloyd L. Lavely, Proceedings of the 71st Annual Meeting of the Air Pollution Control.

*Primary Examiner*—Gregory A. Heller
*Attorney, Agent, or Firm*—Luedeka, Hodges, Neely & Graham

[57] ABSTRACT

A system for the removal of sulfur compounds from the flue gas from a high-sulfur coal combustion unit. The flue gas is contacted with a combination of a calcium hydroxide slurry and gaseous ammonia in a combined stoichiometric ratio which provides for near 100% utilization of the calcium hydroxide and ammonia with a sulfur dioxide removal efficiency approaching 100%. The system is useful in treating flue gas from high-sulfur coal combustion to remove the sulfur dioxide therefrom so that the flue gas can be exhausted to the atmosphere.

6 Claims, 4 Drawing Sheets

METHOD FOR DESULFURIZATION OF FLUE GASES

FIELD OF THE INVENTION

This invention relates to systems methods for the removal of sulfur-containing compounds from the flue gases from coal-burning heating units or the like.

BACKGROUND OF THE INVENTION

In the combustion of coal, such as for power generation and/or steam heating, there are generated flue gases which contain sulfur compounds, principally sulfur dioxide. Coal generally is classified as low, medium or high sulfur coal, depending upon the quantity of sulfur contained within a unit quantity of the coal, i.e. coal having between about 400 to 500 ppm of sulfur is deemed low-sulfur coal and coal having between about 1000 to 3000 ppm or higher of sulfur is deemed high-sulfur coal. All coals thus contain some sulfur and upon combustion of the coal there is released into the flue gases gaseous sulfur dioxide. In those coal-burning units where low or medium-sulfur coal is burned, it has been common heretofore to convert such gaseous sulfur dioxide to solid calcium sulfites/sulfates and to thereafter capture such solid particulates employing any of several well-known particulate removal systems. In one common system for such conversion, the hot flue gas, containing the gaseous sulfur dioxide, is introduced into a spray dryer along with an atomized slurry of calcium hydroxide ($Ca(OH)_2$). In the spray dryer, the calcium hydroxide and sulfur dioxide, in the presence of the water, react to form various calcium sulfite and/or sulfate solid particulates which are subsequently collected, e.g. by particulate removal techniques using fabric filters and/or electrostatic precipitators.

In this technique for removal of the sulfur dioxide from the flue gases, it is a major function of the spray dryer to cool the gaseous effluent (and the solids suspended therein) to a temperature as reasonably near the water saturation temperature for the gaseous effluent as possible (i.e. in the range of about 130° to 140° F.) to permit the sulfur dioxide to be captured as efficiently as possible as is commonly understood in spray dryer technology. These prior art systems function quite satisfactorily when processing the flue gas from low or medium sulfur coal combustion. The prior art $Ca(OH)_2$-based spray dryer/fabric filter systems are capable of removing substantially all the sulfur dioxide from the flue gas (90% or greater). However, such prior art systems are incapable of removing all of the sulfur dioxide from the flue gas emanating from the combustion of high sulfur coal. In this regard, it is noted that in such systems, the quantity of sulfur that can be removed per unit of flue gas is a function of the quantity of calcium hydroxide and water that can be fed into the spray dryer per unit of flue gas and still not cause the flue gas to be cooled to the water saturation temperature of the gas. Thus in these prior art systems, it is physically impossible to introduce into the spray dryer (1) sufficient calcium hydroxide slurry as will provide the quantity of calcium that is necessary to react with all the sulfur in the flue gases emanating from burners of high sulfur coal as well as (2) the quantity of water required to cool the effluent from the spray dryer to a temperature approaching the water saturation temperature of such effluent. Any unreacted sulfur, of course, escapes through the particulate control system to the atmosphere as a contaminant.

Still further, it is known in the prior art that the efficiency of utilization of the calcium hydroxide decreases at the higher slurry concentrations such as are required to provide sufficient calcium for approaching complete reaction with all the sulfur present in the flue gasses.

SUMMARY OF THE INVENTION

In accordance with the present invention, there is provided a system for the removal of substantially all of the sulfur contained in the flue gases emanating from a high-sulfur coal-burning heat source through the means of a combination of reactions involving a calcium-based slurry and ammonia gas wherein these chemicals react with the sulfur dioxide in the flue gas to produce solid particulates that are filterable employing conventional and relatively inexpensive filtration systems. Surprisingly, it has been found that such combination of chemicals results in substantially 100% utilization efficiency of the chemicals and substantially 100% removal of the sulfur dioxide from the flue gas. Further, it has been found that the filtration apparatus appears to act in the nature of a dry reactor and provide for more complete chemical reaction of the various compounds within the system.

Accordingly, it is an object of the present invention to provide a system for the removal of sulfur dioxide from the flue gases of a high-sulfur coal-burning heat source. It is another object to provide a system for removal of such sulfur dioxide wherein there is a substantially complete stoichiometric relationship between the quantity of chemicals employed in the removal process relative to the quantity of sulfur removed. It is another object to provide a system for removal of such sulfur dioxide wherein the sulfur dioxide is converted to particulates that are readily filterable from a gaseous carrier employing relatively inexpensive and available filtration equipment. Other objects of the invention will be recognized from the description contained herein including the drawings in which:

Figure 1:
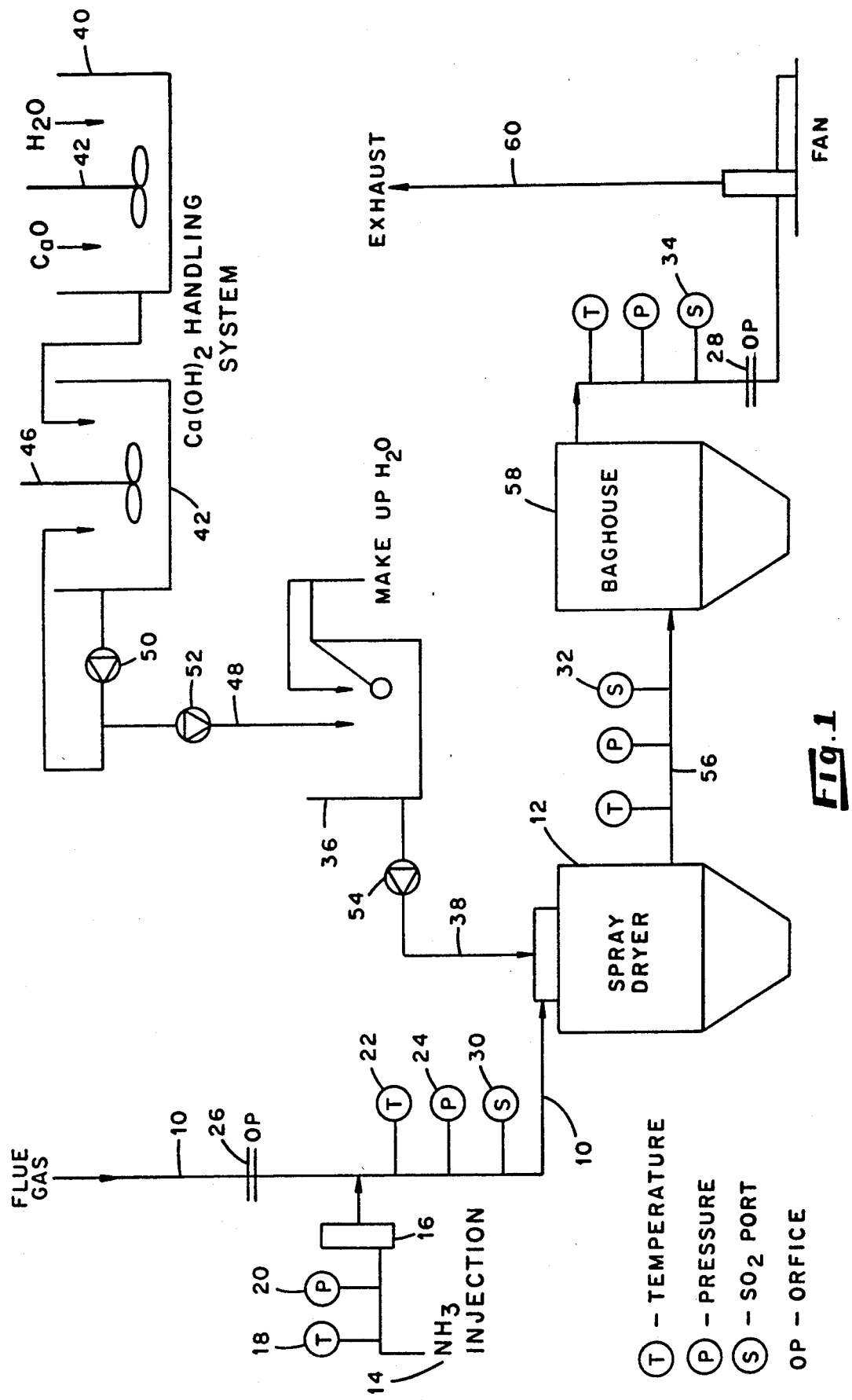
FIG. 1 is a diagrammatic representation of one embodiment of apparatus suitable for use in the system of the present invention.
Figure 6:
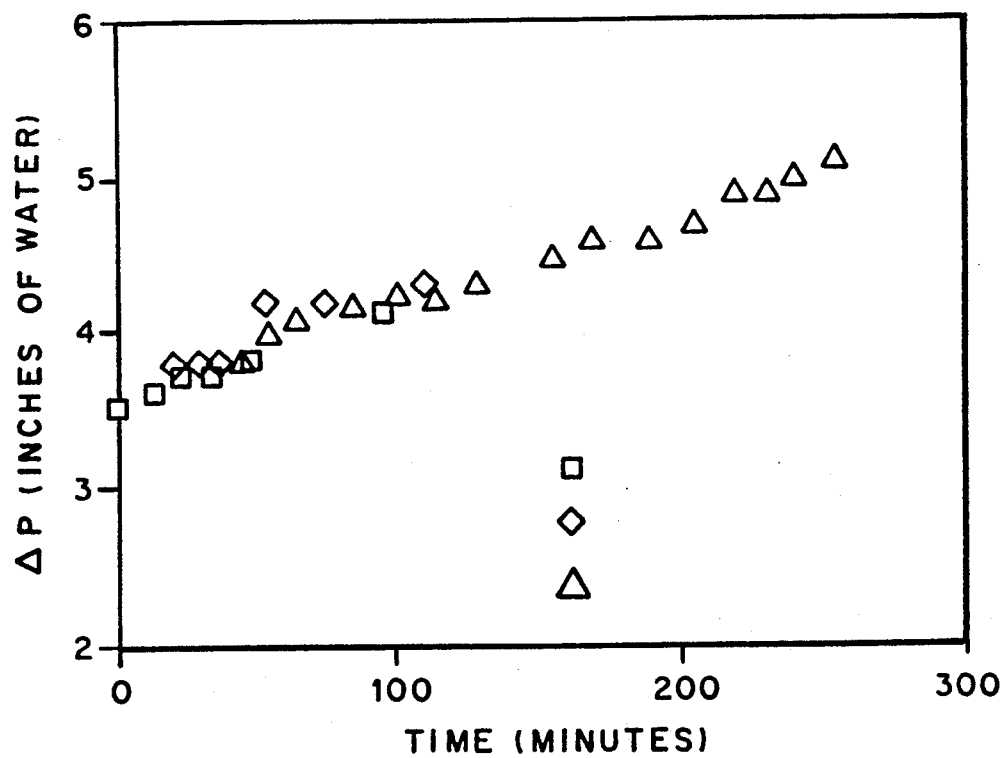
Figure 5:
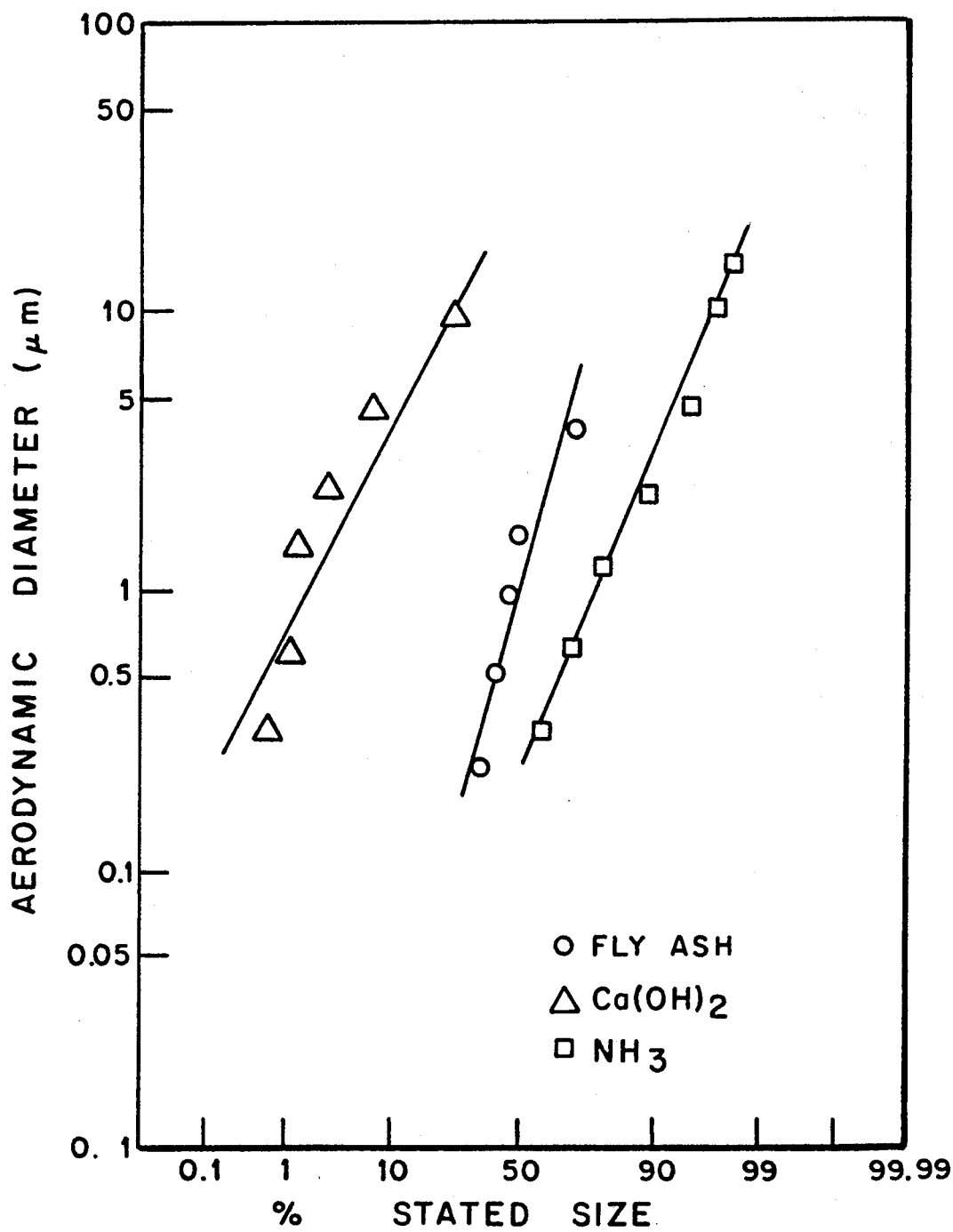

FIG. 5 is a graphic representation of the particulate sizes of the solid reaction products emanating from a spray dryer of the kind depicted in FIG. 1 and employing the present invention, and, FIG. 6 is a graphic representation of the relationship of the pressure drop over time for one embodiment of a typical baghouse type of filtration system when processing the effluent form a spray dryer of the kind depicted in FIG. 1 and employing the present invention.

DETAILED DESCRIPTION OF THE INVENTION

With reference to FIG. 1, in a typical embodiment of apparatus for use in carrying out the present invention, the flue gas from a high-sulfur coal-burning heating unit such a common coal-fired boiler (not shown) is fed via a conduit 10 to a spray dryer 12. At a location in the conduit 10, between the source of the flue gas and the spray dryer, there is connected a source 14 of gaseous ammonia which is in fluid communication with the conduit 10. Valve 16 is provided to regulate the admission of ammonia to the conduit 10 as will be referred to further hereinafter. As desired, temperature 18 and pressure 20 gauges may be interposed between the source of ammonia and the conduit 10. Further temperature 22 and pressure 24 gauges may be provided in the conduit 10 for monitoring the temperature and pressure of the gases passing therethrough. Orifices 26 and 28 are provided as desired for use in measuring flow rates of gases through the system. Additional temperature and pressure gauges, along with sampling parts 30, 32 and 34 may be provided as desired.

Calcium hydroxide slurry from a make-up tank 36 is also fed to the spray dryer 12 as by means of a conduit 38. In the depicted apparatus, the slurry is prepared by slaking CaO in water, with stirring in a first tank 40, feeding such slurry if desired from the first tank 40 to a holding tank 42. The slurry is agitated as by stirrers 44 and 46 while in the first and holding tanks to avoid settling. The slurry is transferred through a conduit 48 from the holding tank 42 to the make-up tank as needed for addition to the spray dryer. In the make-up tank, make-up water is added to the slurry as required to maintain the desired concentration of the slurry. Valves 50, 52 and 54 are provided as desired to regulate the flow of the slurry between the holding tank 42 and the make-up tank 36, and between the make-up tank 36 and the spray dryer 12, respectively.

Typical operating conditions of the spray dryer include an inlet temperature of about 300° F., an approach to saturation of 30° F., hence an outlet temperature of about 160° F., and no recycle.

Upon being admitted to the spray dryer, the slurry is converted into a spray within the area of the upper portion of the spray dryer as by means of a conventional rotating atomizer or by two fluid nozzle. This spray falls by gravity and thereby contacts the flue gas and ammonia entering the spray dryer via the conduit 10, whereupon the sulfur dioxide in the flue gas reacts with both the calcium hydroxide and the ammonia to convert the sulfur dioxide to solid particulates. It will be recognized that some reaction of the sulfur dioxide in the flue gas with the ammonia will occur as these two gases travel through the conduit 10, but the principal portion of such reaction occurs within the spray dryer.

The reaction of the calcium hydroxide with the sulfur dioxide produces solid particulates of calcium sulfites and/or calcium sulfates. Typically these particulates are of particle size of 20–40 $\mu$m. The reaction of the ammonia with sulfur dioxide produces ammonia-based sulfite and/or sulfate reaction products which sublime to the solid state at a temperature of about 180° to 190° F. These solid particulates exhibit an average particle size in the submicron range, e.g. less than about 0.5 $\mu$m. These solids remain entrained in the gases in the spray dryer and are conveyed through a conduit 56 to a baghouse 58 which contains a plurality of bag filters (not shown) as is well known in the art. Within the baghouse, the particulates are collected on the bag filters and the gases are exhausted through an exhaust stack 60 to the atmosphere.

The usual bag-type filter is incapable of filtering out submicron size particulates so that it would be expected that such filtration equipment would not collect the submicron size ammonia-based sulfite or sulfate particulates. However, the present inventors have found that when the calcium-based solid particulates and the ammonia-based particulates are filtered simultaneously, the larger calcium-based particulates tend to collect on the bag filters and function to aid in the collection of the smaller ammonia-based particulates on the bag filters. The exact mechanism for this observed result is not known with certainty, but it is believed that the larger calcium-based particulates possess a relatively large surface area and once they are captured on the bag filter, they tend to attract and hold the smaller ammonia-based particulates. It is also believed that the portion of the calcium-based particulates which initially are collected on the bag filters tend to serve as an additional filtration medium to also aid in capture of the ammonia-based particulates. It is to be noted from FIG. 6, however, that there is no detrimental increase in the pressure drop across the bag filter over time as the particulates collect thereon, at least during the time period of a normal collection cycle. Of course, as the bag filter becomes loaded with particulates, the system is cycled as with a backflow of air to dislodge the particulates which thereupon fall to the bottom of the baghouse 58 for removal. One embodiment of a suitable filtration apparatus includes a well known baghouse-type apparatus which houses a number of fabric bag filters, such as 13.6 ounce/yd.$^2$ fiberglass filter bags cleaned with a low energy compressed air supply (10–13 psi). The collector suitably may be operated at an air/cloth ratio of 2.3 to 1 or 2.3 fpm.

As noted above, a principal function of the spray dryer is to reduce the temperature of the flue gas stream from its usual temperature of about 300° to 400° to a temperature approaching, but not equal to the water saturation temperature of the gas stream. This function is accomplished by selecting the flow parameters of the slurry such that sufficient water is introduced into the spray dryer to effect such desired degree of cooling of the flue gas stream. In the instance of flue gas streams from low-sulfur coal combustion, it is possible to physically admit sufficient calcium and water to the spray dryer to accomplish both the desired reaction of the sulfur with calcium, hence effect the desired removal of the sulfur from the flue gas stream, and at the same time to accomplish the desired degree of cooling of the gas stream prior to its exit from the spray dryer. In the instance of flue gas streams from high-sulfur coal combustion, the quantity of calcium required to react fully with all the sulfur in the flue gas stream is so great that it is physically impossible to obtain a slurry which contains sufficient calcium and also sufficient water to provide the required cooling of the flue gas stream. In the present invention, it has been found that there is a combination of calcium and ammonia which permits the calcium to be slurried with sufficient water to effect the required cooling and which also provides for the desired conversion of the sulfur to solid particulates which are filterable from the gas stream employing conventional and inexpensive filters.

Figure 2:
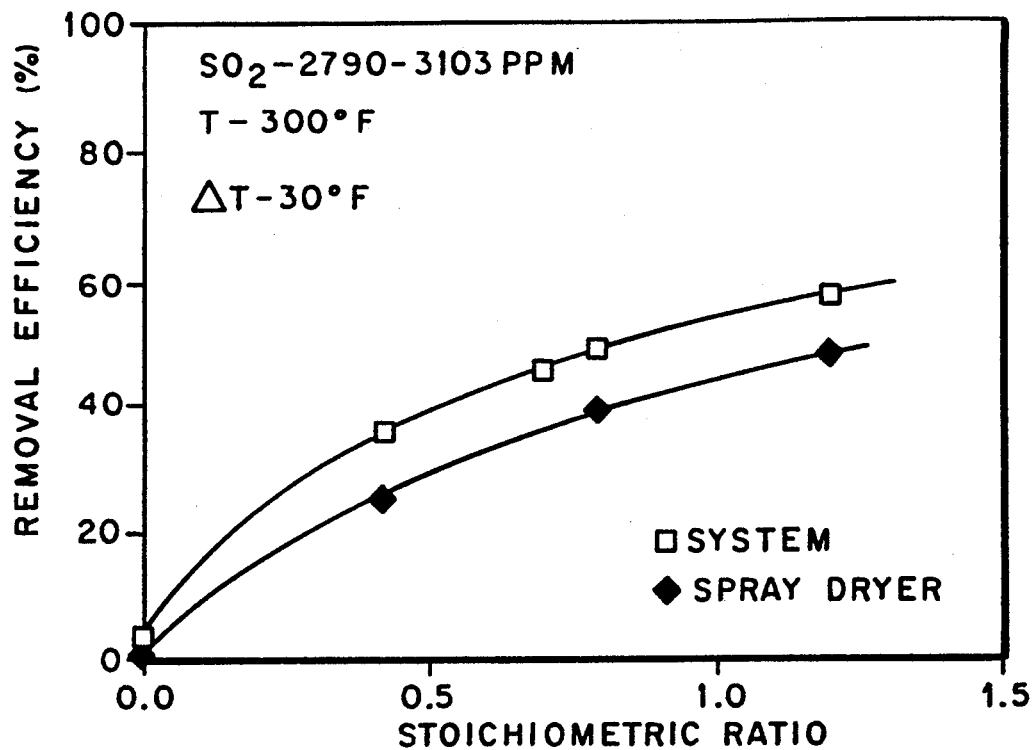
FIG. 2 is a graphic representation of the relationship of the stoichiometric ratio of calcium hydroxide to the efficiency of removal of sulfur dioxide from flue gas employing apparatus of the kind depicted in FIG. 1.
Figure 3:
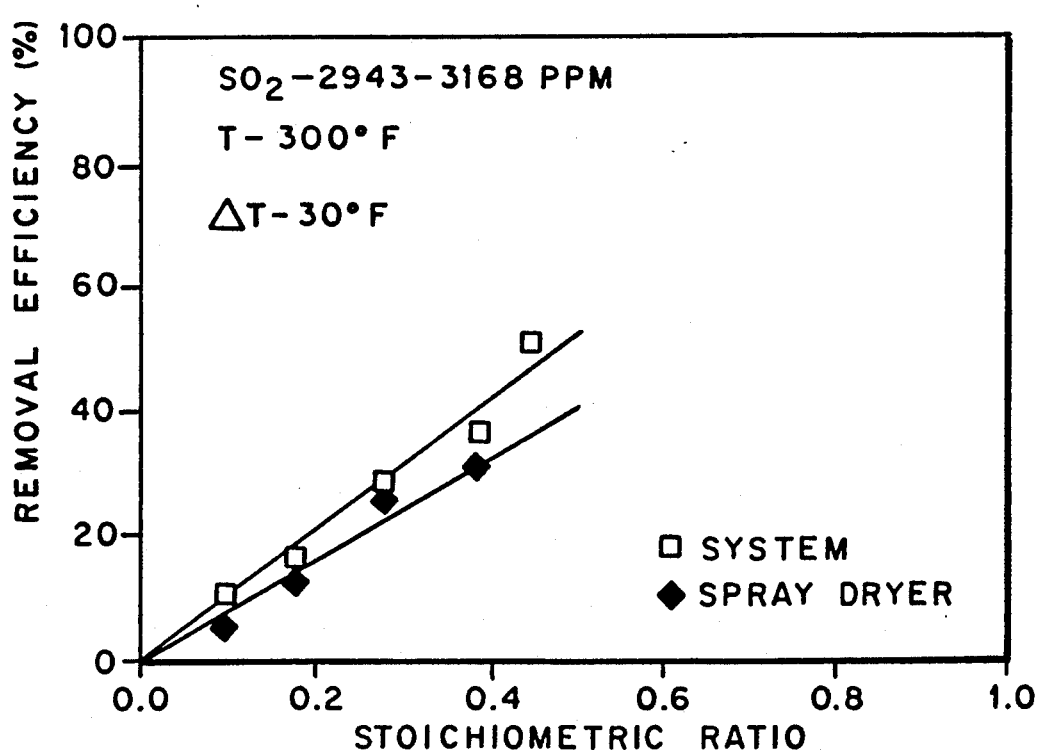
FIG. 3 is a graphic representation of the relationship of the stoichiometric ratio of gaseous $NH_3$ to the efficiency of removal of sulfur dioxide from flue gas employing apparatus of the kind depicted in FIG. 1.
Figure 4:
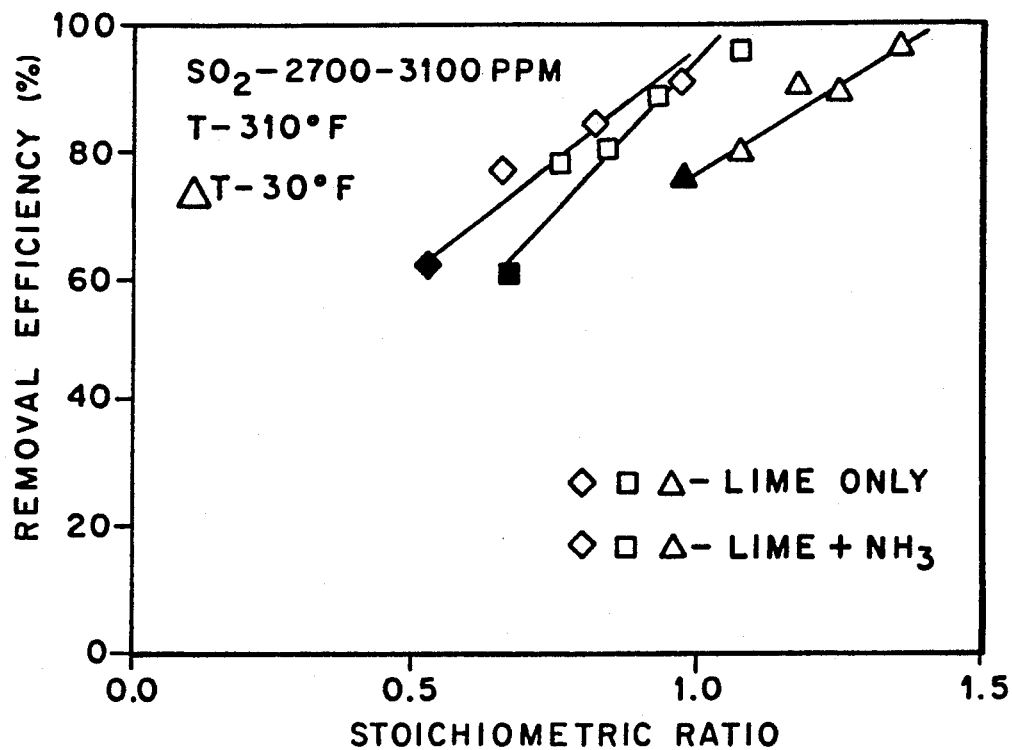
FIG. 4 is a graphic representation of the relationship of the combined stoichiometric ratio of calcium hydroxide and gaseous $NH_3$ to the efficiency of removal of sulfur dioxide from flue gas employing apparatus of the kind depicted in FIG. 1 and in accordance with the present invention.

In this respect, reference is made to FIG. 2 wherein it is noted that the efficiency of sulfur removal from a flue gas stream employing apparatus of the kind depicted in FIG. 1 reaches an optimum at about a stoichiometric ratio of calcium hydroxide to sulfur of about 0.5. Addition of more calcium to the system provides little increase in efficiency of removal of the sulfur, and extrapolation of the "system" curve of FIG. 2 shows that it is not possible to achieve the higher removal efficiencies in this situation. As observable from FIG. 2, at a stoichiometric ratio (SR) of 0.45, there is a removal efficiency of 27%, hence a calcium utilization efficiency of about 55%. At an SR of 1.2, the removal efficiency increases to 48%, hence a calcium utilization efficiency of only 40%. With reference to FIG. 3, which shows the efficiency of sulfur removal from a flue gas stream of ammonia alone, there is a direct linear relationship between the stoichiometric ratio of ammonia to sulfur in the flue gas stream and the efficiency of removal of the sulfur from the gas stream. Notably, at a stoichiometric ratio of about 0.35, the removal efficiency is about 35%, hence an ammonia utilization efficiency of 100%. It is important to note from FIG. 2, that the optimum removal efficiency of sulfur dioxide using calcium hydroxide at a stoichiometric ratio of about 0.5 was about 35%. The present inventors have thus discovered that by selecting stoichiometric ratios of calcium hydroxide and ammonia which represent their respective maximum utilization efficiencies (e.g. SR of 0.5 for the calcium hydroxide and any SR between 0 and 1.0 for the ammonia) and introducing into the reaction system those quantities of calcium hydroxide and gaseous ammonia that develop such SRs, it is possible to provide a system wherein there is substantially 100% removal efficiency at substantially 100% utilization efficiency of the calcium hydroxide and ammonia. This result is evident from FIG. 4 wherein there is depicted the removal efficiency of a system including both calcium hydroxide and ammonia at combined stoichiometric ratios in the range of between about 0.5 and 1.25. It is to be noted from FIG. 4 that at a combined stoichiometric ratio of about 1, there is produced a removal efficiency of almost 100%, hence a utilization efficiency of about 100%.

The particle size characteristics of the solid particulates in the gas stream exiting from the spray dryer are depicted in FIG. 5. The depicted data show the flyash to have an aerodynamic mean diameter ($d_{50}$) of 1.5 to 2.0 $\mu$m with a geometric standard deviation ($\sigma_g$) of greater than 10. The ammonium sulfite/sulfate products had a $d_{50}$ of approximately 0.2 $\mu$m and an $\sigma_g$ of 7.5. The calcium-based particulates exhibited a $d_{50}$ of 22 $\mu$m and an $\sigma_g$ of 4.6.

An analysis of the baghouse pressure drop as a consequence of the collection of the solid particulates on the bag filters was performed. The results are depicted in FIG. 6 and show that the residual pressure drop after cleaning the filter bags was in the range of less than about 3 inches of water which is an acceptable value range.

Under the operating parameters referred to herein, the system functioned with no visible plume emanating from the stack 60, thereby further indicating that the system was effective in removing substantially all of the sulfur and particulates from the flue gas.

Whereas specific examples and values have been set forth herein, the same are to be considered as illustrative and not to be deemed to limit the invention other than as set forth in the claims appended hereto.

What is claimed:

1. A method for the removal of sulfur-oxide compounds from the flue gas stream from a high-sulfur coal combustion unit employing a spray dryer apparatus characterized in that the flue gas stream is contacted in the spray dryer apparatus with gaseous ammonia an a slurry of calcium hydroxide present in a combined stoichiometric ratio of greater than about 0.5 with said contacting being at a temperature sufficient to effect ammonia-sulfur compound and calcium-sulfur compound forming reactions of the ammonia and the calcium hydroxide with sulfur oxide in the flue gas stream and the sublimation of the ammonia-sulfur compounds to form solid particulates.

2. The method of claim 1 and characterized in that said combined stoichiometric ratio is greater than about 0.9 and less than about 1.5.

3. The method of claim 1 and characterized in that the volume of calcium hydroxide slurry is sufficient to reduce the temperature of the effluent from the spray dryer to a value which approaches the water saturation temperature of said effluent.

4. The method of claim 3 and characterized in that the temperature of said effluent exceeds said saturation temperature by at least 20 degrees F., but not greater than about 80 degrees F.

5. The method of claim 3 and characterized in that the temperature of the flue gas entering the spray dryer exceeds about 300° F. and the temperature of the effluent from the spray dryer is not less than about 160° F.

6. The method of claim 2 and characterized in that the stoichiometric ratio of calcium in the combination is within the range of between about 0.4 and about 0.6.

* * * * *

UNITED STATES PATENT AND TRADEMARK OFFICE
CERTIFICATE OF CORRECTION

PATENT NO. : 5,017,349

DATED : May 21, 1991

INVENTOR(S) : Wayne T. Davis, Gregory D. Reed and Timothy C. Keener

It is certified that error appears in the above-identified patent and that said Letters Patent is hereby corrected as shown below:

ON THE TITLE PAGE:

After "The University of Tennessee Research Corporation, Knoxville, Tenn.", insert --by assignment from Wayne T. Davis and Gregory D. Reed, and The University of Cincinnati, Cincinnati, Ohio, by assignment from Timothy C. Keener--.

Signed and Sealed this

Fifth Day of January, 1993

*Attest:*

DOUGLAS B. COMER

*Attesting Officer*      *Acting Commissioner of Patents and Trademarks*